United States Patent [19]

Yoneyama et al.

[11] Patent Number: 5,089,135
[45] Date of Patent: Feb. 18, 1992

[54] CARBON BASED POROUS HOLLOW FIBER MEMBRANE AND METHOD FOR PRODUCING SAME

[75] Inventors: Hiroaki Yoneyama; Yoshihiro Nishihara, both of Otake, Japan

[73] Assignee: Mitsubishi Rayon Co., Ltd., Tokyo, Japan

[21] Appl. No.: 442,325
[22] PCT Filed: Mar. 14, 1989
[86] PCT No.: PCT/JP89/00272
§ 371 Date: Nov. 13, 1989
§ 102(e) Date: Nov. 13, 1989
[87] PCT Pub. No.: WO89/08488
PCT Pub. Date: Sep. 21, 1989

[30] Foreign Application Priority Data

Jan. 20, 1988 [JP] Japan ............................ 63-010200
Mar. 15, 1988 [JP] Japan ............................ 63-060928

[51] Int. Cl.5 .............................................. B01D 69/08
[52] U.S. Cl. ........................... 210/500.23; 210/500.43; 264/29.2
[58] Field of Search ............ 55/16158; 429/44; 210/500.25, 500.21, 500.23, 500.43; 264/29.1, 29.2, 29.6, 29.7, 29.5, 83, 85, 288.8

[56] References Cited

U.S. PATENT DOCUMENTS

| | | | |
|---|---|---|---|
| 3,884,754 | 5/1975 | Kimura et al. ................ | 264/29 X |
| 3,977,967 | 8/1976 | Trulson et al. ............. | 210/500.25 X |
| 4,261,832 | 4/1981 | Schumacher et al. .......... | 55/16 X |
| 4,496,637 | 1/1985 | Shimada et al. ............. | 429/44 |
| 4,517,142 | 5/1985 | Baniel ..................... | 264/22 |
| 4,685,940 | 8/1987 | Soffer et al. .............. | 55/16 X |
| 4,919,860 | 4/1990 | Schindler et al. ........... | 264/29.1 |

FOREIGN PATENT DOCUMENTS

| | | |
|---|---|---|
| 2173198 | 5/1973 | France. |
| 53-1179 | 1/1978 | Japan. |
| 57-75107 | 5/1982 | Japan. |
| 60-179102 | 9/1985 | Japan. |
| 61-47827 | 3/1986 | Japan. |
| 63-4812 | 1/1988 | Japan. |

Primary Examiner—Frank Spear
Attorney, Agent, or Firm—Oblon, Spivak, McClelland, Maier & Neustadt

[57] ABSTRACT

A carbon based porous hollow fiber membrane excellent in heat resistance wherein it has pores which continuously penetrate from inner wall surface to outer wall surface of the membrane, maximum value of pore radius obtained from pore volume differential curve is in 10-1000 nm, total pore volume is 0.1-1 cm$^3$/g, curvature radius at flexing is 10 cm or less, and temperature at which 10% by weight of the membrane is decomposed and which is measured by TGA is at least about 300° C. and a method for producing the abovementioned carbon based porous hollow fiber membrane having excellent heat resistance, characterized by comprising mixing an acrylonitrile based polymer (A) containing 90-100 mol % of acrylonitrile unit, a heat decomposable polymer (B) which is heat decomposed at a temperature of 600° C. or lower to become low in molecular weight, and a solvent (C), then spinning and drawing the mixture to obtain an acrylonitrile based hollow fiber, subjecting this hollow fiber to oxidizing treatment and then subjecting the hollow fiber to carbonizing treatment at 400° C. or higher to make it porous.

20 Claims, 3 Drawing Sheets

FIG. 3
PORE VOLUME CUMULATIVE DISTRIBUTION CURVE

CARBON BASED POROUS HOLLOW FIBER MEMBRANE AND METHOD FOR PRODUCING SAME

TECHNICAL FIELD

The present invention relates to a novel carbon based porous hollow fiber membrane which is excellent in heat resistance and a method for making it.

BACKGROUND ART

As active carbon fibers for adsorption and separation, several kind are known. These are, for example, those which are made from regenerated cellulosic fibers, acrylonitrile fibers, phenolic fibers and pitch fibers. Fibrous active carbon has many merits in its shape such as a much greater contact area than particulate active carbon and, thus, higher adsorption and desorption rates. Furthermore, by employing hollow fibers, troublesome steps of adsorption and desorption can be omitted and separation from a fluid becomes possible simply by passing fluid through the hollow fibers making an energy-saving process possible. With reference to hollow active carbon fibers, Japanese Patent Kokai No. 48-87121 discloses a hollow fiber, having the ability to adsorb trace substances in a gas or liquid which is made by forming voids in a carbon material to achieve a void content of 10-80% and a specific surface area of 400 m$^2$/g or more. The method for making this hollow fiber comprises crosslinking the skin portion of fiber made from phenol as raw material, extracting the uncrosslinked core portion with a solvent to obtain a hollow fiber, carbonizing this hollow fiber and furthermore making it porous by activation treatment with an oxidizing gas such as water vapor. Therefore, the resulting pores are micropores of 10-20 Å in radius, and the hollow portion of the resulting hollow fiber lack, uniformity and is high in flow resistance and exhibits alow permeation rate.

Japanese Patent Kokai No. 58-91826 discloses a pitch based hollow carbon fiber, but the inner diameter of the hollow portion is small, less than 10 μm, and there are no pores in the membrane wall. Thus a membrane for separation is not intended.

Japanese Patent Kokai Nos. 60-179102 and 60-202703 disclose carbon membranes of multi-layer structure, but the carbon membrane of the former has at least one finely porous dense layer and at least one layer has large pores for the increase of the permeation rate and the orientation coefficient as the whole multi-layer structure is small, 0.7. The carbon membrane of the latter also comprises porous layer having separating ability and porous layer of sponge structure having voids of 5 μm or more in maximum pore diameter for the increase of the permeation rate and is of very brittle membrane structure and cannot be used practically.

Furthermore, Japanese Patent Kokai No. 61-47827 discloses a carbonized hollow fiber from polyvinyl alcohol fiber and according to the disclosure, a dehydrating agent is penetrated into only the surface layer portion and the portion is infusibilized at the carbonization step and the central portion in which the dehydrating agent is not penetrated is molten and removed to make it hollow. In addition the fiber is subjected to an activation treatment with water vapor to make a porous hollow carbon fiber.

Japanese Patent Kokai No. 63-4812 (=EP252339) has proposed a method for making a carbon membrane having pores by which a hollow fiber membrane provided with pores by the extraction method is treated with an aqueous hydrazine solution and then subjected to oxydizing treatment and carbonizing treatment.

However, porous hollow carbon fibers of these conventional techniques mostly have micropores of 1-5 nm and are insufficient in properties such as strength from a practical viewpoint.

The average radius of pores of active carbon fiber and porous hollow carbon fiber of the conventional techniques is small, namely, 1-5 nm and are suitable for adsorption or separation of substances of relatively small molecular weight from the vapor phase, but are not suitable for the adsorption and separation of substances of relatively large molecular weight from vapor or liquid phase as aimed at by the present invention. Furthermore, most of the fibers of the conventional techniques are low in elongation and lack flexibility.

DISCLOSURE OF INVENTION

Under these circumstances, the present inventors conducted intensive studies in order to develop carbon based porous hollow fiber membrane having a sharp peak of pore distribution in the range of 10-1000 nm in pore radius, pores in this range being called macropores, and a method for efficient production thereof and as a result, the present invention has been accomplished.

BRIEF DESCRIPTION OF DRAWINGS

The drawings attached hereto explain the contents of the present invention.

BEST MODE FOR CARRYING OUT THE INVENTION

The gist of the present invention resides in a carbon based porous hollow fiber membrane excellent in heat resistance which has pores which continuously penetrate from the inner wall surface to the outer wall surface of the hollow fiber membrane, the maximum value of pore radius obtained from pore volume differential curve being 10-1000 nm, the total pore volume being 0.1-1 cm$^3$/g, curvature radius at flex being 10 cm or less and temperature at which 10% by weight of the hollow fiber membrane is decomposed and which is measured by TGA being at least about 300° C.

It is preferred that a single fiber of the carbon based porous hollow fiber membrane of the present invention has a tensile elongation of at least 0.8%.

The maximum value of pore radius obtained from the pore volume differential curve in the present invention is the maximum value of the distribution curve of pore radius in terms of that of a cylinder which is measured by the mercury penetration method. The total pore volume is a cumulative value of pore volume.

The greatest characteristics of the carbon based porous hollow fiber membrane of the present invention are that it has pores penetrating from the inner wall surface to the outer wall surface of the hollow membrane and the pores have a greater pore radius as compared with conventional active carbon fibers because the maximum value of the pore radius obtained from the pore volume differential curve is 10-1000 nm and thus it is suitable for adsorption and removal of a substance having relatively large molecular weight from gaseous phase or liquid phase containing such substance. Further, the present membrane is excellent in flexibility since curvature radius at flex is 10 cm or less. If a carbon based porous hollow fiber membrane does not satisfy even one of the above-mentioned various properties, the effect of the porous hollow fiber membrane aimed at by the present invention is exhibited with difficulty and this is not preferred.

As a preferred method for producing the carbon based porous hollow fiber membrane of the present invention, mention may be made of, for example, a method which comprises mixing an acrylonitrile based polymer (A) containing 90-100 mol% of acrylonitrile units, a heat decomposable polymer (B) which is heat decomposed at lower than 600° C. to become low in molecular weight and solvent (C), then spinning the mixture, drawing the filaments to obtain acrylonitrile type hollow fibers, subjecting the fibers to an oxidizing treatment and then carbonizing them at a temperature higher than 400° C. to make them porous.

In production of carbon based porous hollow fiber membrane by the above method, since the solubility parameter δ of the acrylonitrile based polymer (A) is generally in the vicinity of 15.4 and that of the heat decomposable polymer (B) is mostly 9-12.2 and thus, in many cases, these are poor in compatibility with each other, compatibility of (A) and (B) can be improved by mixing a compatibilizer (D) as an optional component depending on combination of the acrylonitrile based polymer (A) and the heat decomposable polymer (B).

The acrylonitrile based polymer (A) used in practice of the present invention is a homopolymer or a copolymer comprising 90-100 mol% of acrylonitrile units and 0-10 mol% of a monomer copolymerizable with acrylonitrile. Examples of the copolymerizable monomers include acrylic acid, methacrylic acid, itaconic acid and derivatives thereof such as methyl acrylate, ethyl acrylate, benzyl acrylate, methyl methacrylate, ethyl methacrylate, etc.: amide derivatives such as acrylamide, methacrylamide, etc.: halogenated monomers such as vinyl acetate, vinyl chloride, vinylidene chloride, etc.: and sulfonic acid derivatives such as sodium methacrylsulfonate, sodium styrenesulfonate, etc. These are not limitative. Especially preferred acrylonitrile based polymers (A) are polyacrylonitrile, acrylonitrilemethacrylic acid copolymer, acrylonitrile-methyl acrylate-itaconic acid copolymer, acrylonitrile-methyl acrylate-methacrylic acid copolymer, etc. The polymerization degree of the acrylonitrile based polymer (A) shown by its specific viscosity is preferably 0.1-0.4, more preferably 0.2-0.3 in terms of specific viscosity. If it is outside this range, spinning operation tends to become difficult or properties of fibers obtained by spinning tend to be inferior.

The heat decomposable polymer (B) used in the practice of the present invention is one which decomposes at 600° C. or lower to become low in molecular weight and is soluble in solvent for acrylonitrile based polymer (A). Examples of such heat decomposable polymer are homopolymers of aromatic vinyl type monomers such as styrene, α-methylstyrene, vinyltoluene, etc., aliphatic vinyl type monomers such as vinyl chloride, vinyl alcohol, vinyl acetate, etc., methacrylate type monomers such as methyl methacrylate, ethyl methacrylate, n-butyl methacrylate, and copolymers comprising at least 51 mol% of the above monomer and at most 49 mol% of other copolymerizable monomer than acrylonitrile. Especially preferred are styrene based polymers, vinyl chloride based polymers and methyl methacrylate based polymers Examples of other copolymerizable monomers are acrylate monomers such as methyl acrylate, ethyl acrylate, n-butyl acrylate, etc. and acrylic acid, methacrylic acid, etc.

The polymerization degree of the heat decomposable polymer (B) which is shown by its specific viscosity is 0.1-0.4, preferably 0.2-0.3 in terms of specific viscosity measured by the same method as for the measurement of specific viscosity of the acrylonitrile based polymer (A) in order to make easy the adjustment of viscosity when the heat decomposable polymer (B) is mixed with the acrylonitrile based polymer (A) to prepare a dispersion.

The solvent (C) used in the practice of the present invention is one which can be a common solvent for acrylonitrile based polymer (A), heat decomposable polymer (B) and compatibilizer (D) which is an optional component mentioned hereinafter. Preferred examples of such solvent (C) are dimethylacetamide, dimethylformamide, dimethylsulfoxide, etc.

The compatibilizer (D) is a polymer which can be a compatibilizer exhibiting compatibilizing effect for both the acrylonitrile based polymer (A) and the heat decomposable polymer (B). There are various polymers including low molecular weight polymers such as oligomers and high molecular weight polymers which exhibit the compatibilizing effect, but preferably used are polymers containing in the same polymer chain a segment (a) which has compatibility with acrylonitrile based polymer (A) or is composed of the same monomers as of the acrylonitrile based polymer (A) and a segment (b) which similarly has compatibility with the heat decomposable polymer (B) or which is composed of the same monomer as of the heat decomposable polymer (B), for example, block copolymers or graft copolymers. Such block copolymers or draft copolymers can be produced by known processes such as disclosed in Japanese Patent Kokoku No. 61-39978.

Compatibilizer (D) has an action to make a solution of acrylonitrile based polymer (A) and a solution of heat decomposable polymer (B) into uniform small dispersion particles when acrylonitrile based polymer (A) and heat decomposable polymer (B) are mixed with solvent (C) and to keep the resulting dispersed solution at stable state. Furthermore, this compatibilizer (D) not only enhances the compatibilizing effect, but also is used for control of size, as a dispersion phase, of heat decomposable polymer (B) which becomes an island component. This leads to control of size of fibrils of heat decomposable polymer (B) on which is based the pore diameter of finally obtained carbon based porous hollow fiber membrane. Therefore, the amount of this compatibilizer used has a relation with pore diameter of the finally obtained porous hollow fiber membrane and with an increase of the amount, the radius of pore decreases and distribution of pore size is reduced, resulting in tendency to provide uniform pore radius distribution.

Preferred examples of compatibilizer (D) are block copolymers and graft copolymers comprising at least 30 mol% of acrylonitrile, at least 10 mol% of a monomer which is a constituting component of the heat decomposable polymer (B) and at most 10 mol% of other monomers copolymerizable with the above monomers.

The mixing ratio of acrylonitrile based polymer (A), heat decomposable polymer (B) and compatibilizer (D) in production of the carbon based porous hollow fiber membrane is preferably acrylonitrile based polymer (A): 10-90% by weight, more preferably 20-80% by weight, heat decomposable polymer (B): 10-90% by weight, more preferably 20-80% by weight, and compatibilizer (D): 0-10% by weight, more preferably 0-5% by weight [total amount of component (A), component (B) and component (D) is 100% by weight].

The mixing amount of heat decomposable polymer (B) is less than 10% by weight, it is difficult to form pores which penetrate from the inner wall surface to the outer wall surface of the finally obtained porous hollow fiber membrane. With an increase in the amount of heat decomposable polymer (B), the number of penetrating pores increases and the pore volume also increases and when the amount exceeds 90% by weight, the total pore volume increases and as a result, the strength of the finally obtained porous hollow fiber membrane is lowered.

With an increase in the amount of compatibilizer (D), the size of dispersed particles decreases resulting in an increase of stability of dispersion solution. This contributes to decrease in the diameter of the pores of the finally obtained porous hollow fiber membrane to a narrow distribution of pore size. If the amount of the compatibilizer exceeds 5% by weight, the effect of addition is saturated and an amount of up to 5% by weight suffices.

The polymer concentration in a mixed solution of the polymer mixture and solvent (C) is 10-35% by weight, preferably 15-30% by weight. Mixing may be carried out simultaneously with dissolution. Alternatively, the polymers may be individually dissolved and these solutions may be mixed just before spinning by a known static kneading element which requires no driving part. In this case, compatibilizer (D) is not necessarily required. The effect of mixing is controlled by the number of the elements. That is, when the number of the elements increases, the radius of pores of the finally obtained porous hollow fiber membrane decreases.

If the concentration of the polymer in the mixed solution is less than 10% by weight the strength of the finally obtained porous hollow fiber membrane decreases. If it is more than 35% by weight, the viscosity of the mixed solution increases which causes troubles such as a loss of stability of the mixed solution and difficulty in filtering.

The mixed dispersion solution is spun in the form of hollow fiber, for example, by a ring slit, a nozzle of sheath-core type, etc. Spinning can be carried out by any method of wet spinning, dry jet-wet spinning and dry spinning and dry jet-wet spinning is especially preferred.

An explanation will be made with reference to spinning by the dry jet-wet spinning method. A solution discharged, for example, from a sheath-core type nozzle is passed once through air and then introduced into a coagulation bath to coagulate the solution there. As coagulating agents, those which are relatively gentle in coagulating power are preferred because phase separation proceeds moderately and a strong membrane can be easily obtained. Normally, an aqueous solution of solvent is used and it is preferred to carry out coagulation with a solvent concentration of 40-85% by weight, preferably 60-80% by weight and at a temperature of 40° C. or lower, preferably 20° C. or lower. Outside this range, the hollow membrane obtained is apt to become brittle Then, the coagulated solution was washed with warm or hot water and drawn Drawing is carried out in two or more stages and to 3 times or more, preferably 5 times or more in total draw ratio. Draw ratio is preferably as high as possible within the range in which structure of fiber is not ruptured, and the upper limit of the total draw ratio is about 80% of draw ratio at which breaking occurs although it varies depending on drawing method and drawing medium. Then, the drawn filaments are dried and a hollow fiber membrane comprising mainly a mixture of acrylonitrile based polymer (A) and heat decomposable polymer (B) is produced therefrom.

The size of the hollow fiber membrane can be changed depending on the kind of nozzle, amount of discharged solution and drawing conditions, but membranes having an inner diameter of 20 $\mu$m - 1000 $\mu$m and a thickness within the range of $\frac{1}{4}$-1/10 of the inner diameter are easily produced. Thereafter, the resulting hollow fiber membrane of the polymer blend is subjected to an oxidizing treatment, for example, in as oxidizing gas (gas containing $O_2$, $O_3$, S, NO, $SO_2$ or the like) atmosphere, usually, air at 200°-300° C. The oxidizationproofing treatment is controlled so that fibers of the hollow fiber membrane do not shrink in lengthwise direction. Excess shrinking at the oxidizing step causes reduction in mechanical strength of the fibers of the hollow fiber membrane and is not preferred Furthermore, excess elongation causes breaking of fibers of hollow fiber membrane and is not preferred. Therefore, it is preferred to carry out the oxidizing treatment under while controlling the elongation within the range of 0-15%.

Then, the resulting fibers of the hollow fiber membrane subjected to oxidizing treatment are subjected to a carbonizing treatment with controlling tension in an inert gas (such as $N_2$, Ar, He, or the like) atmosphere or in a mixed gas of an inert gas and an oxidizing gas (such as HCl, $H_2O$, CO, $O_2$, or the like), preferably in an inert gas, usually nitrogen gas at 400°-1200° C., preferably 600°-1200° C. At this stage, the fibril component of heat decomposable polymer (B) arranged on the fiber axis is heat decomposed and depolymerized and thus decomposed to low molecular weight molecules such as monomers and is allowed to escape, whereby the carbon based porous hollow fiber membrane of the present invention can be obtained.

The porous structure of the carbon based porous hollow fiber membrane, being different from a sponge structure, comprises countless pores which are arranged in parallel with the fiber axis besides the penetrating pores from the inner wall surface to the outer wall surface of the hollow fiber membrane. This can be observed by the scattering intensity of small-angle X-ray scattering or by a scanning electron microscope. It is considered that such a peculiar porous structure is formed for the following reason. That is, in the at spinning of the mixed solution, respective dispersed particles undergo action of shearing stress or drawing and fibrils of respective polymers are phase-separated from each other to form interlocked network structure. Therefore, the fibrils of heat decomposable polymer (B) which are arranged in parallel with fiber axis are heat decomposed and released to form countless pores and as a result such porous structure is finally obtained to give excellent strength characteristics and flexibility characteristics to the porous hollow fiber membrane. The carbonaceous structure comprising fibril structure of the acrylonitrile based polymer (A) is also such a structure arranged in parallel with the fiber axis, which strengthens the hollow fiber membrane of the present invention. Moreover, since it is carbonaceous, it exhibits excellent effects such as superior heat resistance.

The characteristics of the carbon based porous hollow fiber membrane of the present invention are that since the pore radius distribution obtained from the pore volume differential curve is very sharp, high separation ability is shown, and total pore volume is large and the number of pores per unit thickness of membrane is large, which enhance the water permeation rate.

Furthermore, the carbon membrane of the present invention is high in chemical stability and shows strong resistance against all pH areas and most chemicals.

The carbon based porous hollow fiber membrane of the present invention can provide modules capable of being used at higher temperatures because the temperature at which weight loss thereof in air reaches 10% is in the range of 300°-650° C. These excellent characteristics are employed in various uses. For example, they can be employed in separation and purification of pyrogens high molecular substances in the field of medical industry. They can be also used in separation of gases, especially organic gases and purification of organic chemicals in the field of chemical industry In the field of food industry, they can be effectively used in clarification of liquors, soft drinks, soy sauce, vinegar, etc.

As further uses, mention may be made of purification of products from enzymes and separation of proteins and enzymes in the field of bio-industry.

Further, they are especially effective in separation of proteins, virus, bacteria in the medical field and in the fields where sterilization and pasteurization at high temperature are required.

They can also be used in the fields where heat resistance is required, for example, filtering membrane for condensation turbine heater drain in power station.

EXAMPLES

The present invention will be specifically explained by the following examples, wherein "part" is by weight.

1) Specific viscosity of a polymer was measured in a solution prepared by dissolving 0.1 g of polymer in 100 ml of dimethylformamide containing 0.1 N of sodium thiocyanate at 25° C.

2) Pore distribution structure of carbon based porous hollow fiber membranes was measured by a POROSIMETER 200 manufactured by CARLO ERBA Co. and the radius of pores was measured in terms of radius of cylinder.

3) Specific surface area was obtained by measurement of the methanol isothermic adsorption curve and calculation by a application of formula of BET.

4) Tensile strength and elongation of single fiber was measured by a TENSILON UTM-II (manufactured by Toyo Sokki Co.) at a pulling rate of 100%/min.

5) Curvature radius at flex: When a porous hollow fiber membrane was wound round a cylinder having a radius R at least 180°, the minimum radius for which breaking of the membrane did not occur was taken as curvature radius at flex.

6) Heat resistance was shown by the temperature at which 10% by weight of sample was decomposed when the sample was subjected to dynamic thermogravimetric analysis (TGA) at a heating rate of 10° C./min in air atmosphere.

7) Water permeation rate was shown by amount of water which passed from the inner wall to the outer wall of hollow fiber under a pressure of 1 kg/cm$^2$ from one side of a module having an effective length of 10 cm and an effective surface area of 1 m$^2$ which was manufactured for trial.

EXAMPLE 1

Four mixed solutions as shown in table 1 were prepared from 60 parts of AN/MAA copolymer (A) having a specific viscosity of 0.24 and composed of 98 mol% of acrylonitrile (hereinafter abbreviated to "AN") and 2 mol% of methacrylic acid (hereinafter abbreviated to "MAA") and 40 parts of MMA/MA copolymer having a specific viscosity of 0.21 and composed of 99 mol% of methyl methacrylate (hereinafter abbreviated to "MMA") and 1 mol% of methyl acrylate (hereinafter abbreviated to "MA") which was heat decomposable copolymer (B) with changing mixing amount of compatibilizer ($D_1$) prepared in the following manner.

Dimethylformamide (hereinafter abbreviated to "DMF") was used as solvent (C). The concentration of polymer was 26% by weight and the mixed solution was kept at 60° C. to carry out deaeration.

Preparation of compatibilizer ($D_1$)

One part of cyclohexanone peroxide ["PEROXA H" (trademark) manufactured by Nippon Oil & Fats Co. Ltd.) was dissolved in 100 parts of MMA and the resulting solution, 800 parts of pure water and 1 part of PELEX OTP (trademark, manufactured by Nippon Oil & Fats Co., Ltd.) were charged in a reaction vessel and the atmosphere was sufficiently replaced with inert gas. Then, this was kept at 40° C. and the content was adjusted to pH 3 with 0.76 part of Rongalit and aqueous sulfuric acid solution, followed by starting polymerization. Stirring was continued as it was and after 150 minutes, the emulsion polymerization of the first stage was completed In the second stage, 72 parts of AN was added to the emulsion, then temperature was raised to 70° C., stirring was again continued for 150 minutes and furthermore, 4 parts of Glauber's salt was added, followed by stirring for 30 minutes to complete the polymerization. The resulting polymer was taken out and subjected to filtration, washing with water and drying to obtain compatibilizer ($D_1$) which was a block copolymer having a polymerization rate of 65.7% and a specific viscosity of 0.19.

Each of the resulting four mixed solutions was discharged from sheath portion and air was discharged from core portion of a sheath-core type nozzle comprising the sheath portion of 2.0 mmΦ in outer diameter and 1.5 mmΦ in inner diameter and the core portion of 1.0 mmΦ under a water-gauge pressure of 10 mm. The discharged solution was allowed to run 5 cm in air and then led to a coagulation bath of 70 wt% aqueous DMF solution of 2° C. and spun and coagulated and then subjected to washing and drawing to 2.8 times in warm water of 60° C. Then, the coagulated solution was drawn to 2 times in hot water of 98° C. The resulting fibers of 5.6 times in total draw ratio were dried by passing them between hot rolls of 160° C. to produce four kinds of polymer blend type hollow fibers.

These four kinds of hollow fibers were respectively set on stainless steel frames of 50 cm long and were treated at the fixed length in an air atmosphere of 230° C. for 3 hours to perform oxidization. Then, the fibers were subjected to carbonization treatment at from room temperature to 800° C. for 50 minutes and at 800° C. for 20 minutes in a nitrogen atmosphere to make them porous, whereby the carbon based porous hollow fiber membranes were produced.

These four kinds of hollow fiber membranes had an inner diameter of $380 \pm 10$ μm and a thickness of $50 \pm 5$ μm.

Tensile strength and elongation of single fiber, specific surface area, maximum value of pore radius, total pore volume, curvature radius at flexing, water permeation rate and heat resistance of these hollow fiber membranes were measured and the results are shown in Table 1.

From the results of Table 1, it can be seen that with an increase in the amount of compatibilizer ($D_1$) (AN/MMA) block copolymer, the maximum value of pore radius decreases.

Figure 1:
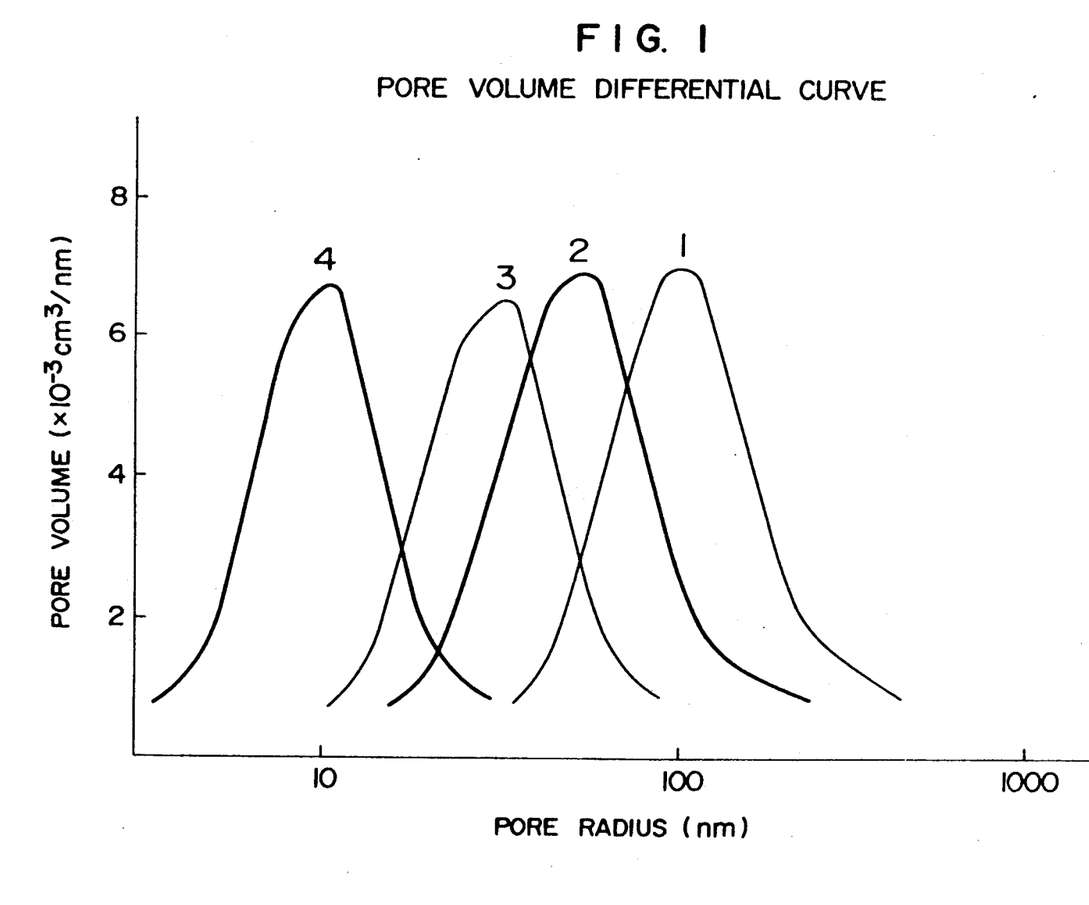
FIG. 1 shows pore volume differential curves of hollow fiber membranes obtained in Experiment Nos. 1-4 in Example 1.

Pore volume differential curves of these four kinds of hollow fiber membranes (Experiment Nos. 1–4) are shown in FIG. 1.

Preparation of compatibilizer ($D_2$)

One part of cyclohexanone peroxide ["PEROXA H" (trademark) manufactured by Nippon Oil & Fats Co. Ltd.) was dissolved in 100 parts of MMA and the resulting solution, 800 parts of pure water and 1 part of PELEX OTP (trademark, manufactured by Nippon Oil & Fats Co., Ltd.) were charged in a reaction vessel and atmosphere was sufficiently replaced with inert gas. Then, this was kept at 40° C. and the content was adjusted to pH 3 with 0.76 part of Rongalit and aqueous sulfuric acid solution, followed by starting polymerization Stirring was continued as it was and after 120 minutes, the emulsion polymerization of first stage was completed In the second stage, 60 parts of AN and 10 parts of VAc were added to the emulsion, then the temperature was raised to 70° C., stirring was again continued for 150 minutes and furthermore, 4 parts of Glauber's salt was added, followed by stirring for 30 minutes to complete the polymerization. The resulting polymer was taken out and subjected to filtration, washing with water and drying to obtain compatibilizer ($D_2$) which was a block copolymer having a polymerization rate of AN 30 mol%/MMA 65 mol%/VAc 5 mol%.

The resulting solution was discharged from the same

TABLE 1

| Experiment No. | | The present invention | | | |
|---|---|---|---|---|---|
| | | 1 | 2 | 3 | 4 |
| Blending (AN/MAA) copolymer | (part) | 60 | 60 | 60 | 60 |
| ratio (MMA/MA) copolymer | (part) | 40 | 40 | 40 | 40 |
| (AN/MMA) block copolymer | (part) | 0 | 1 | 3 | 5 |
| Tensile strength of single fiber | (kg/mm$^2$) | 65.2 | 69.1 | 77.8 | 75.4 |
| Tensile elongation | (%) | 1.2 | 1.2 | 1.3 | 1.4 |
| Specific surface area | (m$^2$/g) | 165 | 184 | 209 | 210 |
| Maximum value of pore radius | (nm) | 107 | 53 | 34 | 11 |
| Total pore volume | (cm$^3$/g) | 0.31 | 0.32 | 0.29 | 0.28 |
| Curvature radius | (cm) | 5 | 3 | 3 | 3 |
| Water permeation rate | (cc/cm$^2 \cdot$ min $\cdot$ atm) | 11.8 | 7.6 | 3.6 | 0.5 |
| Heat resistance | (°C.) | 450 | 450 | 450 | 450 |

Example 2

An AN/MA/IA copolymer (A) having a specific viscosity of 0.21 and composed of 95 mol% of AN, 4 mol% of MA, and 1 mol% of itaconic acid (hereinafter abbreviated to "IA"), a heat decomposable polymer (B) which was an MMA/MA copolymer having a specific viscosity of 0.19 and composed of 87 mol% of MMA and 13 mol% of MA and a compatibilizer ($D_2$) which was a block copolymer having a specific viscosity of 0.18 and composed of 30 mol% of AN, 65 mol% of MMA and 5 mol% of vinyl acetate (hereinafter abbreviated to "VAc" and which was prepared by the following method at a blending ratio as shown in Table 2 were dissolved in dimethylacetamide (hereinafter abbreviated "DMAc") which was solvent (C). Polymer concentration was 24% by weight.

nozzle as used in Example 1 and in the same manner as in Example 1. The discharged solution was allowed to run 5 cm in air and then led to a coagulation bath of 72 wt% aqueous DMAc solution of 7° C to be spun and coagulated and then the resulting fiber was subjected to washing and drawing to 2 times in warm water of 60° C. and then was drawn to 3.2 times in hot water of 98° C. Separately, as a comparative sample (Experiment No.9), the same procedure was carried out except that the fiber was not drawn in hot water and passed therethrough at fixed length. These were dried to obtain five kinds of polymer blend type hollow fibers In the same manner as in Example 1, these five kinds of hollow fibers were set on metal frame and subjected to an oxidizing treatment in air atmosphere of 240° C. for 3 hours Then, the fibers were subjected to a carbonization treatment at 900° C. for 10 minutes in nitrogen atmosphere to obtain carbon based porous hollow fiber membrane. The properties of the resulting five kinds of hollow fiber membranes are shown in Table 2.

TABLE 2

| Experiment No. | | | | Comparative Example | The present invention | | | Comparative Example |
|---|---|---|---|---|---|---|---|---|
| | | | | 5 | 6 | 7 | 8 | 9 |
| Blending (AN/MA/IA) | copolymer | (part) | | 82 | 72 | 62 | 52 | 52 |
| ratio (MMA/MA) | copolymer | (part) | | 15 | 25 | 35 | 45 | 45 |
| (AN/MMA/VAC) | block copolymer | (part) | | 3 | 3 | 3 | 3 | 3 |
| Total draw ratio | | (X) | | 6.4 | 6.4 | 6.4 | 6.4 | 2.0 |

TABLE 2-continued

|  | | Comparative Example | The present invention | | | Comparative Example |
|---|---|---|---|---|---|---|
| Experiment No. | | 5 | 6 | 7 | 8 | 9 |
| Yield | (%) | 57.3 | 50.3 | 43.0 | 36.0 | 37.1 |
| Inner diameter of hollow fiber membrane | (μm) | 456 | 430 | 400 | 390 | 760 |
| Thickness | (μm) | 70 | 58 | 44 | 40 | 80 |
| Tensile strength of single fiber | (kg/mm$^2$) | 107 | 92 | 74 | 63 | 10 |
| Tensile elongation | (%) | 1.3 | 1.2 | 1.1 | 1.1 | 0.7 |
| Specific surface area | (m$^2$/g) | 211 | 197 | 205 | 223 | 240 |
| Maximum value of pore radius | (nm) | 29 | 30 | 32 | 35 | 50 |
| Total pore volume | (cm$^3$/g) | 0.03 | 0.33 | 0.44 | 0.51 | 0.70 |
| Curvature radius | (cm) | 2 | 3 | 3 | 3 | 15 |
| Water permeation rate | (cc/cm$^2$ · min · atm) | 0 | 2.2 | 3.2 | 9.6 | — |
| Heat resistance | (°C.) | 500 | 500 | 500 | 500 | 500 |

Yield = 100 × weight per unit length of carbon based porous hollow fiber membrane weight per unit length of acrylic hollow fiber From the results of Table 2, it can be seen that with an increase in the amount of heat decomposable polymer blended, the total pore volume increases. The comparative sample of Experiment No. 5 had closed pores and had no penetrating pores. The comparative sample of Experiment No. 9 was inferior in flexibility and was not able to be used.

Figure 2:
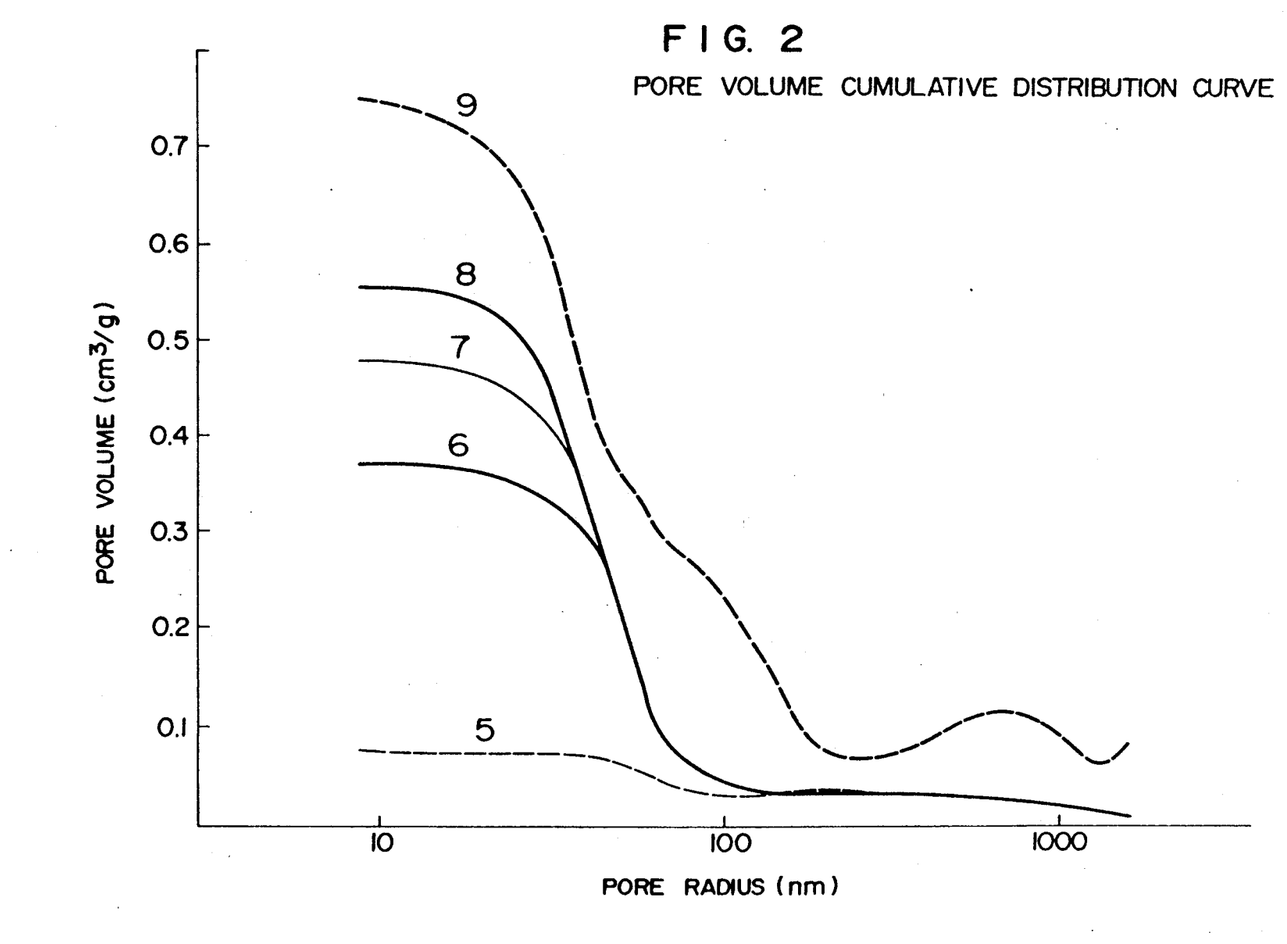
FIG. 2 shows pore volume cumulative distribution curves of hollow fiber membranes obtained in Experiment Nos. 5-9 in Example 2.

Pore volume cumulative distribution curves of these five hollow fiber membranes (Experiment Nos. 5-9) are shown in FIG. 2.

Example 3

The acrylic hollow fibers produced in Experiment No. 7 in Example 2 were subjected to oxidizing treatment by passing through air atmosphere having temperature distribution of four stages of 236°/239°/242°/250° C. at a rate of 20 m/Hr. Then, the oxidized fibers were subjected to a treatment for making porous by passing them through nitrogen atmospheres of carbonization temperatures as shown in Table 3 at a rate of 15 m/Hr to produce the porous hollow fiber membranes. Various properties of these fibers are shown in Table 3.

Figure 3:
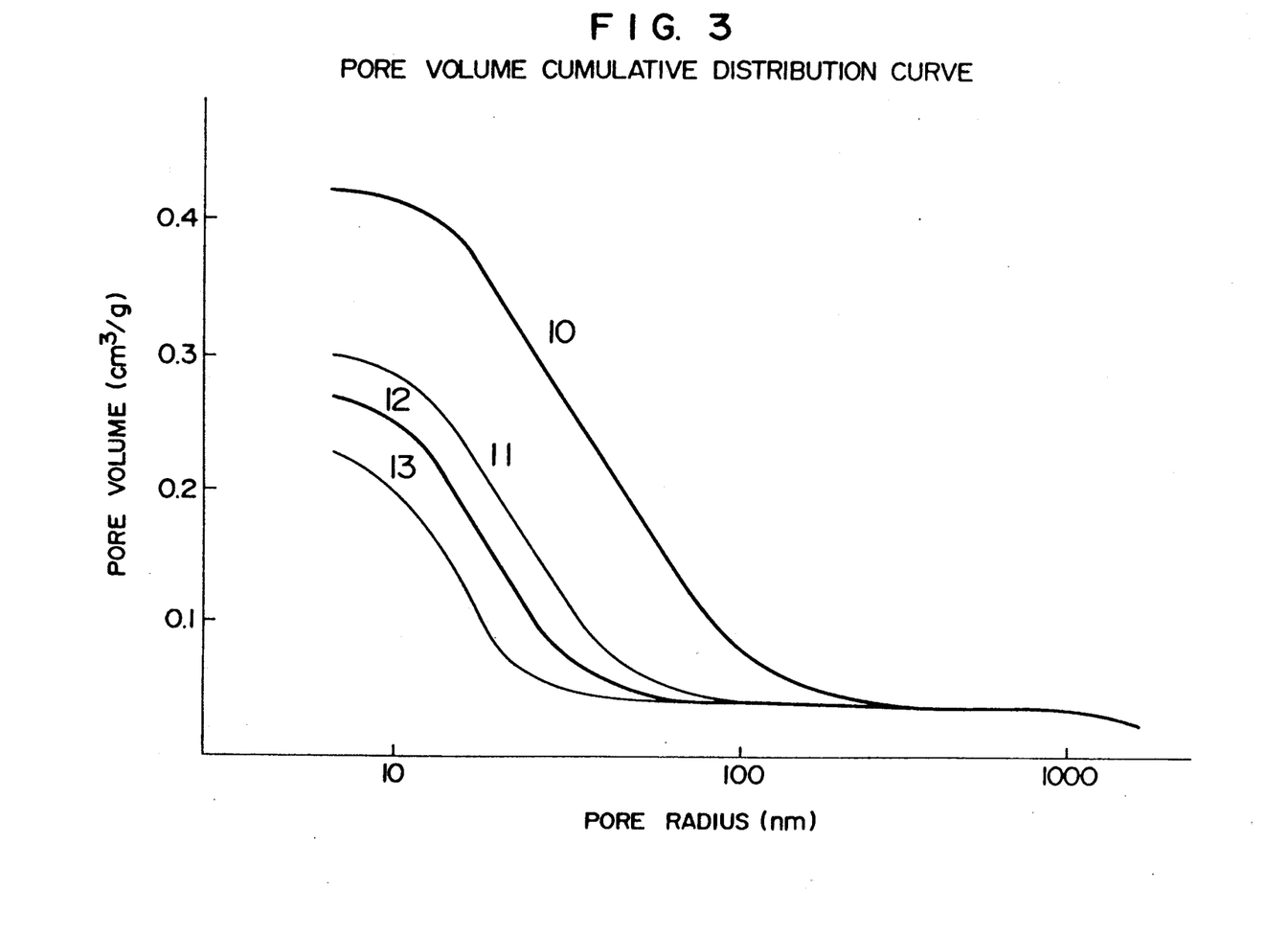
FIG. 3 shows pore volume cumulative distribution curves of hollow fiber membranes obtained in Experiment Nos. 10-13 in Example 3.

Pore volume cumulative distribution curves of these four kinds of hollow fibers (Experiment Nos. 10-13) are shown in FIG. 3.

TABLE 3

|  | | The present invention | | | |
|---|---|---|---|---|---|
| Experiment No. | | 10 | 11 | 12 | 13 |
| Carbonization temperature | (°C.) | 600 | 800 | 1000 | 1200 |
| Yield | (%) | 53.4 | 47.0 | 38.6 | 30.0 |
| Tensile strength of single fiber | (kg/mm$^2$) | 50 | 65 | 78 | 89 |
| Tensile elongation | (%) | 2.2 | 1.4 | 1.2 | 1.0 |
| Specific surface area | (m$^2$/g) | 130 | 200 | 120 | 109 |
| Maximum value of pore radius | (nm) | 30 | 20 | 15 | 10 |
| Total pore volume | (cm$^3$/g) | 0.42 | 0.30 | 0.27 | 0.25 |
| Heat resistance | (°C.) | 400 | 450 | 550 | 650 |

From the results of Table 3, it can be seen that with an increase of carbonization temperature, the maximum value of pore radius decreases and the total pore volume also decreases while heat resistance increases.

We claim:

1. A carbon based porous hollow fiber membrane excellent in heat resistance, having an internal diameter of 20 μm to 1,000 μm with a wall thickness of 2 μm to 250 μm, pores which continuously penetrate from inner wall surface to outer wall surface of the membrane, a pore size distribution such that the distribution curve of pore radius has a maximum value of 10-1000 nm, a total pore volume of 0.1-1 cm$^3$/g, and a curvature radius at flexing of 10 cm or less, and wherein the temperature at which 10% by weight of the membrane is decomposed as measured by TGA is at least about 300° C.

2. A hollow fiber membrane according to claim 1, which has a tensile elongation of at least 0.8%.

3. A method for producing a carbon based porous hollow fiber membrane excellent in heat resistance, having pores which continuously penetrate from inner wall surface to outer wall surface of the membrane, a pore size distribution such that the distribution curve of pore radius has a maximum value of 10-1000 nm, a total pore volume of 0.1-1 cm$^3$g, and a curvature radius at flexing of 10 cm or less, and wherein the temperature at which 10% by weight of the membrane is decomposed as measured by TGA is at least about 300° C., which comprises mixing an acrylonitrile based polymer (A) containing 90-100 mol% of acrylonitrile units, a heat decomposable polymer (B) which is heat decomposed at a temperature of 600° C. or lower to become low in molecular weight, and a solvent (C), then spinning and drawing the mixture to obtain an acrylonitrile based hollow fiber, subjecting this hollow fiber to oxidizing treatment and then subjecting the hollow fiber to carbonizing treatment at 400° C. or higher to make it porous.

4. A method according to claim 3, wherein a compatibilizer (C) is further mixed with acrylonitrile based polymer (A), heat decomposable polymer (B) and solvent (C).

5. A method according to claim 3 or 4, wherein the acrylonitrile based polymer (A) is polyacrylonitrile, acrylonitrile-methacrylic acid copolymer, acrylonitrile-methyl acrylate-itaconic acid copolymer or acrylonitrile-methyl acrylate-methacrylic acid copolymer.

6. A method according to claim 3 or 4, wherein the heat decomposable polymer (B) is a homopolymer of aromatic vinyl monomer, aliphatic vinyl monomer or methacrylate type monomer or a copolymer comprising 51 mol% or more of the above monomer and 49 mol% or less of copolymerizable monomer unit other than acrylonitrile.

7. A method according to claim 3 or 4, wherein the heat decomposable polymer (B) is styrene based polymer, vinyl chloride based polymer or methyl methacrylate based polymer.

8. A method according to claim 3 or 4, wherein specific viscosity of the acrylonitrile based polymer (A) is 0.1-0.4.

9. A method according to claim 3 or 4, wherein specific viscosity of the acrylonitrile based polymer (A) is 0.2-0.3.

10. A method according to claim 3 or 4, wherein specific viscosity of the heat decomposable polymer (B) is 0.1-0.4.

11. A method according to claim 3 or 4, wherein specific viscosity of the heat decomposable polymer (B) is 0.2-0.3.

12. A method according to claim 4, wherein the compatibilizer (D) is a graft copolymer or a block copolymer which contains in the same polymer chain a segment (A) having compatibility with the acrylonitrile based polymer (A) or comprising the same monomer and a segment (B) having compatibility with the heat decomposable polymer (B) or comprising the same monomer.

13. A method according to claim 4, wherein the compatibilizer (D) comprises 30 mol% or more of acrylonitrile, 10 mol% or more of monomer constituting the heat decomposable polymer (B) and 10 mol% or less of other monomer copolymerizable with these monomers.

14. A method according to claim 3 or 4, wherein the mixing is carried out so that the acrylonitrile based polymer (A) is in an amount of 10-90% by weight, the heat decomposable polymer (B) is in an amount of 10-90% by weight and the compatibilizer (D) is in an amount of 0-5% by weight.

15. A method according to claim 3 or 4, wherein the mixing is carried out so that the acrylonitrile based polymer (A) is in an amount of 20-80% by weight, the heat decomposable polymer (B) is in an amount of 20-80% by weight and the compatibilizer (D) is in an amount of 0-5% by weight.

16. A method according to claim 3 or 4, wherein the solvent (C) is selected from dimethylformamide, dimethylcetamide and dimethylsulfoxide.

17. A method according to claim 3 or 4, wherein the spinning is carried out by dry jet-wet type spinning method.

18. A method according to claim 3 or 4, wherein drawing is carried out under the condition of 3 times or more in total drawing ratio by multi-stage drawing method.

19. A method according to claim 3 or 4, wherein the oxidizing treatment is carried out with controlling the elongation within the range of 15% or less.

20. A method according to claim 3 or 4, wherein the carbonizing treatment is carried out with controlling the tension.

* * * * *